United States Patent
Eldridge et al.

(10) Patent No.: US 11,971,136 B2
(45) Date of Patent: Apr. 30, 2024

(54) CORNER MOUNTING DEVICE AND SYSTEM

(71) Applicants: Peter Leroy Eldridge, Melbourne, FL (US); Jonathan David Eldridge, Titusville, FL (US)

(72) Inventors: Peter Leroy Eldridge, Melbourne, FL (US); Jonathan David Eldridge, Titusville, FL (US)

(*) Notice: Subject to any disclaimer, the term of this patent is extended or adjusted under 35 U.S.C. 154(b) by 0 days.

(21) Appl. No.: 17/717,064

(22) Filed: Apr. 9, 2022

(65) Prior Publication Data

US 2023/0324001 A1    Oct. 12, 2023

(51) Int. Cl.
*A47G 1/17*    (2006.01)
*F16M 13/02*    (2006.01)

(52) U.S. Cl.
CPC ............. *F16M 13/025* (2013.01); *A47G 1/17* (2013.01)

(58) Field of Classification Search
CPC .... F16M 13/025; F16M 13/02; A47G 1/1653; A47G 1/06; A47G 1/17
USPC ......................................... 248/211, 251, 264
See application file for complete search history.

(56) References Cited

U.S. PATENT DOCUMENTS

| | | | |
|---|---|---|---|
| 4,438,578 A | 3/1984 | Logan | |
| 4,498,654 A * | 2/1985 | Cooper | A47K 10/10 248/262 |
| 4,641,441 A | 2/1987 | Roth | |
| D342,662 S * | 12/1993 | Lavin, Sr. | D8/354 |
| 5,373,654 A | 12/1994 | Whalen | |
| 5,454,542 A | 10/1995 | Hart | |
| 5,810,317 A * | 9/1998 | Macchi | A47G 1/1653 248/300 |
| 7,171,755 B1 | 2/2007 | Arent et al. | |
| D605,930 S * | 12/2009 | Piersant | D8/381 |
| D750,143 S * | 2/2016 | Oetlinger | D15/138 |
| 9,498,073 B2 | 11/2016 | Argyle | |
| 10,575,663 B2 | 3/2020 | Krake et al. | |
| 10,945,540 B2 | 3/2021 | Krake et al. | |
| 2009/0314908 A1 | 12/2009 | Kassouni | |
| 2011/0186707 A1 | 8/2011 | Argyle | |
| 2017/0055729 A1 | 3/2017 | Krake et al. | |

* cited by examiner

*Primary Examiner* — Bradley Duckworth
(74) *Attorney, Agent, or Firm* — Olav M. Underdal; IDP Patent Services

(57) ABSTRACT

A corner mounting system for self-aligning and self-leveling mounting of a mounting object in a corner between a left adjoining wall and a right adjoining wall includes: a left corner mounting device with left front and rear mounting surface; a right corner mounting device with right front and rear mounting surfaces; and optionally left and right lower support members; such that the left and right corner mounting devices can be connected between respectively the left and right adjoining walls, and left and right rear sides of the mounting object, using double-sided tape or screws, which can slide into notches of the left and right left corner mounting devices.

24 Claims, 14 Drawing Sheets

CORNER MOUNTING DEVICE AND SYSTEM

CROSS-REFERENCE TO RELATED APPLICATIONS

N/A.

FIELD OF THE INVENTION

The present invention relates generally to the field of corner mounting devices and systems, and more particularly to methods and systems for corner mounting of a mounting object.

BACKGROUND OF THE INVENTION

Most private and commercial residences have decorative and/or functional objects mounted on walls to present items for decorative and/or informational purposes.

However, hanging objects in a level position can be difficult and require additional tools. Further, such systems almost exclusively address the hanging of an object on a wall surface but are not designed for hanging a decorative and/or functional object in the corner between two adjoining walls.

As such, considering the foregoing, it may be appreciated that there continues to be a need for novel and improved devices and methods for methods and systems for corner mounting of a decorative and/or functional object, such as a frame assembly with a picture or other decoration.

SUMMARY OF THE INVENTION

The foregoing needs are met, to a great extent, by the present invention, wherein in aspects of this invention, enhancements are provided to the existing model of for corner mounting of a decorative and/or functional object.

In an aspect, a corner mounting system for mounting a mounting object in a right-angled corner of a wall can include:
a) the mounting object; and
b) a left corner mounting device, such that a left front mounting surface of the left corner mounting device is connected to a top left portion of a rear surface of the mounting object; and
c) a right corner mounting device, such that a right front mounting surface of the right corner mounting device is connected to a top right portion of a rear surface of the mounting object;
such that a left rear mounting surface of the left corner mounting device is connected to a left adjoining wall on a left side of a corner between the left adjoining wall and a right adjoining wall;
such that a right rear mounting surface of the right corner mounting device is connected to a right adjoining wall on a right side of the corner;
whereby the mounting object is mounted in the corner between the left adjoining wall and the right adjoining wall.

In a related aspect, the corner mounting system can be configured such that:
a) the left corner mounting device can be configured with a 45-degree angle, between the left front mounting surface and the left rear mounting surface; and
b) the right corner mounting device can be configured with a 45-degree angle, between the right front mounting surface and the right rear mounting surface;
such that the mounting object is positioned in a vertical plane of a hypotenuse of a right-angled triangle, when the corner is a right-angled corner.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

Figure 1:
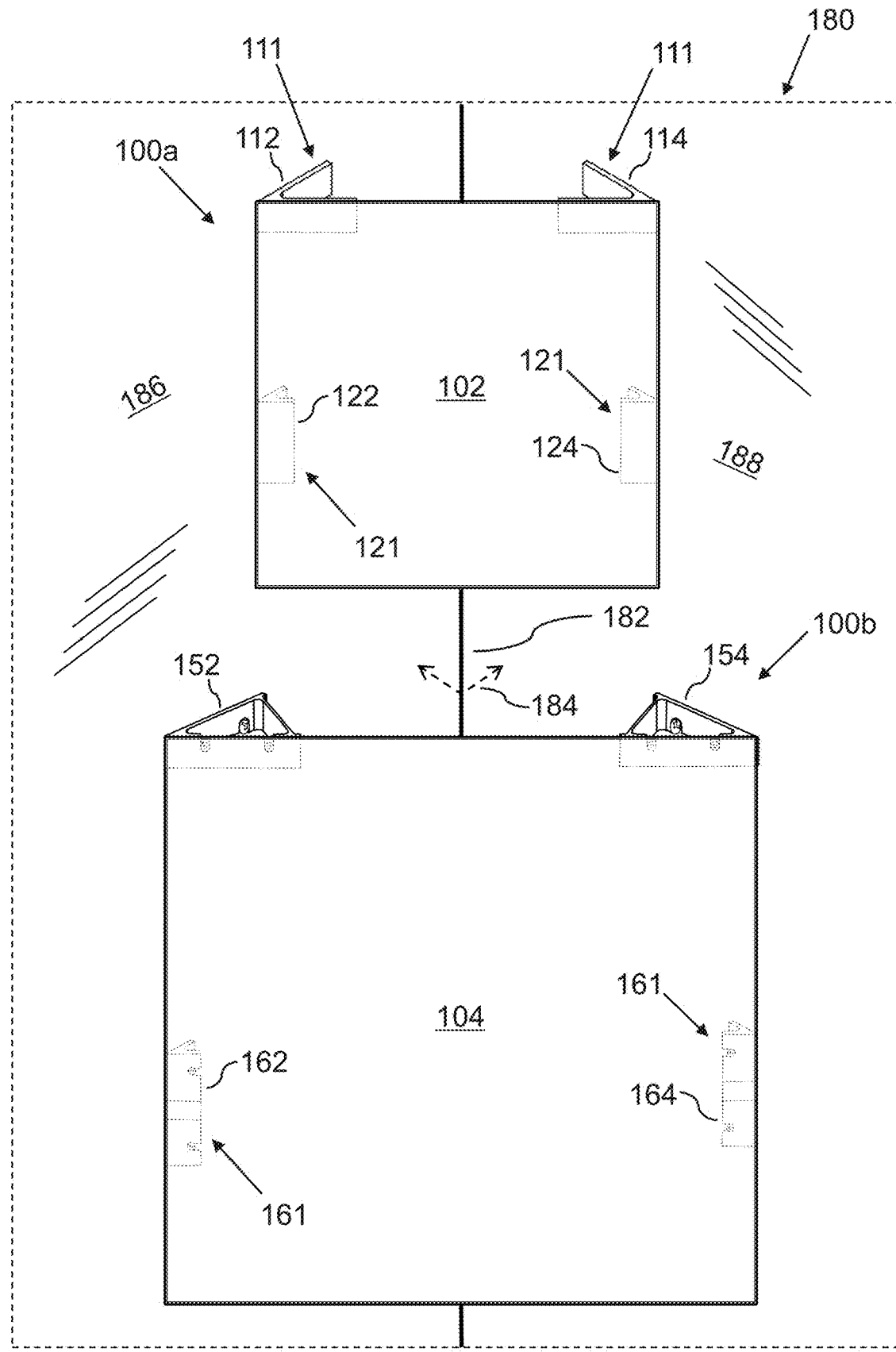
FIG. 1 is a front perspective view illustrating a first corner mounting system and a second corner mounting system, which are mounted on a corner of a wall, according to an embodiment of the invention.

In the following, we describe the structure of an embodiment of a corner mounting system 100 for mounting a mounting object in a corner with reference to FIG. 1, in such manner that like reference numerals refer to like components throughout; a convention that we shall employ for the remainder of this specification. FIG. 1 shows a corner mounting system 100a configured for use with a small or medium sized mounting object, and a corner mounting system 100a configured for use with a large sized mounting object.

Figure 6A:
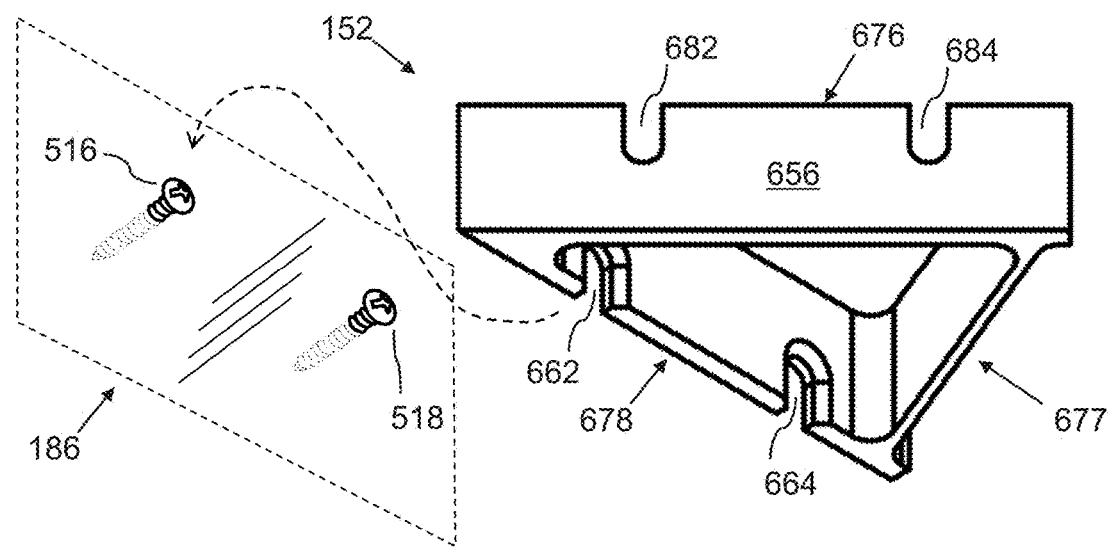
FIG. 6A is a front bottom perspective view of a left corner mounting device for mounting a larger mounting object, according to an embodiment of the invention.
Figure 6B:
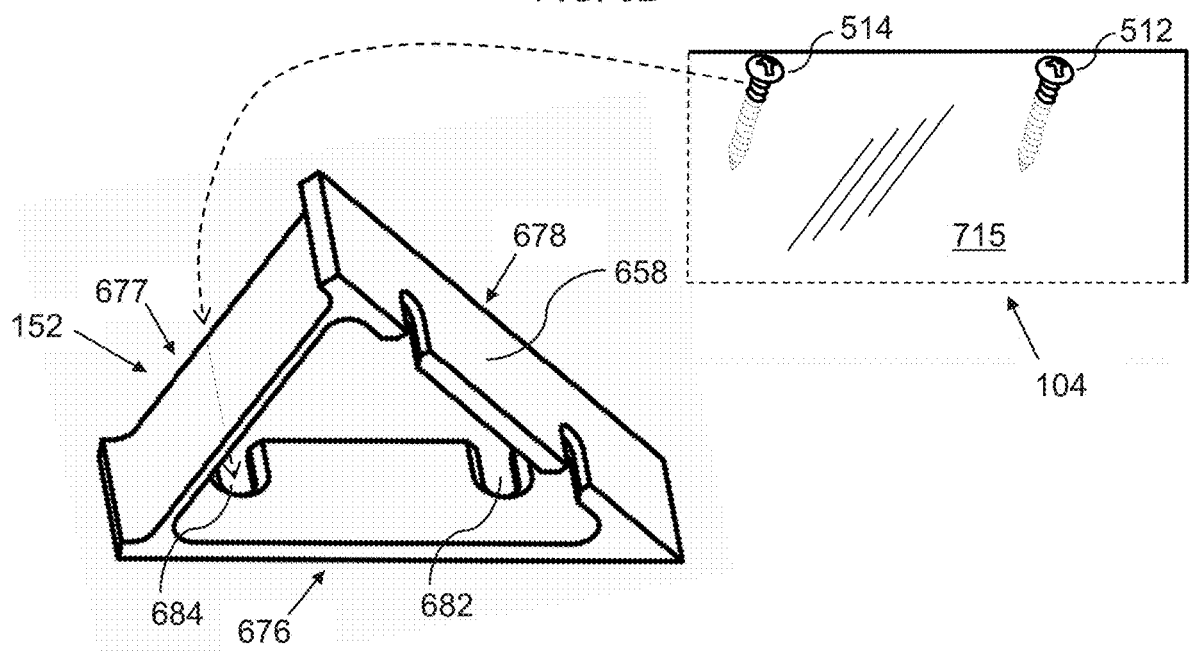
FIG. 6B is a rear bottom perspective view of a left corner mounting device for mounting a larger mounting object, according to an embodiment of the invention.
Figure 6C:
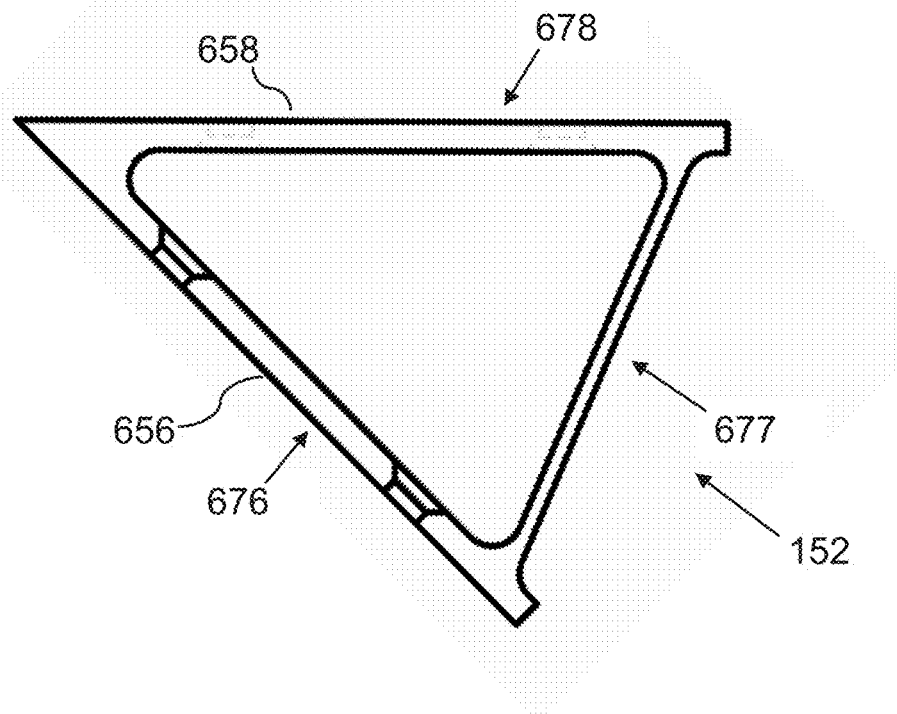
FIG. 6C is a top view of a left corner mounting device for mounting a larger mounting object, according to an embodiment of the invention.
Figure 6D:
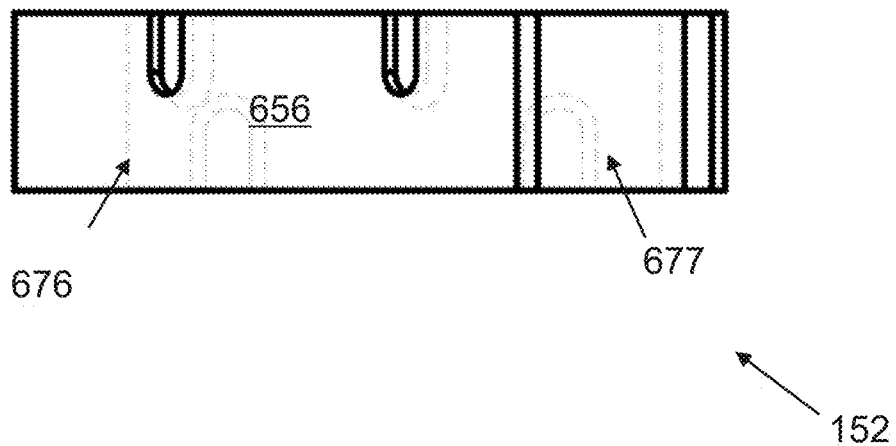
FIG. 6D is a side view of a left corner mounting device for mounting a larger mounting object, according to an embodiment of the invention.

In an embodiment, as shown in FIG. 1, a corner mounting system 100a, 100b for mounting a mounting object 102, 104 (such as a frame assembly 102, 104) in a right-angled 184 corner 182 of a wall 180, can include:

a) a mounting object 102, 104;
b) a left corner mounting device 111, 112 comprising:
   i. a left front mounting surface 316, 656; and
   ii. a left rear mounting surface 318, 658;
   wherein the left front mounting surface 316, 656 is connected to a top left portion of a rear surface 715 of the mounting object 102, 104, as shown in FIG. 6B; and
c) a right corner mounting device 111, 114, comprising:
   i. a right front mounting surface 316, 656; and
   ii. a right rear mounting surface 318, 658;
   wherein the right front mounting surface 316, 656 is connected to a top right portion of a rear surface 715 of the mounting object 102, 104;
such that the left rear mounting surface 318, 658 of the left corner mounting device 112 is connected to a left adjoining wall 186 on a left side of a corner 182 between the left adjoining wall 186 and a right adjoining wall 188;
such that a right rear mounting surface 318 of the right corner mounting device 114 is connected to a right adjoining wall 188 on a right side of the corner 182;
whereby the mounting object is mounted in the corner 182 between the left adjoining wall 186 and the right adjoining wall 188.

Figure 2A:
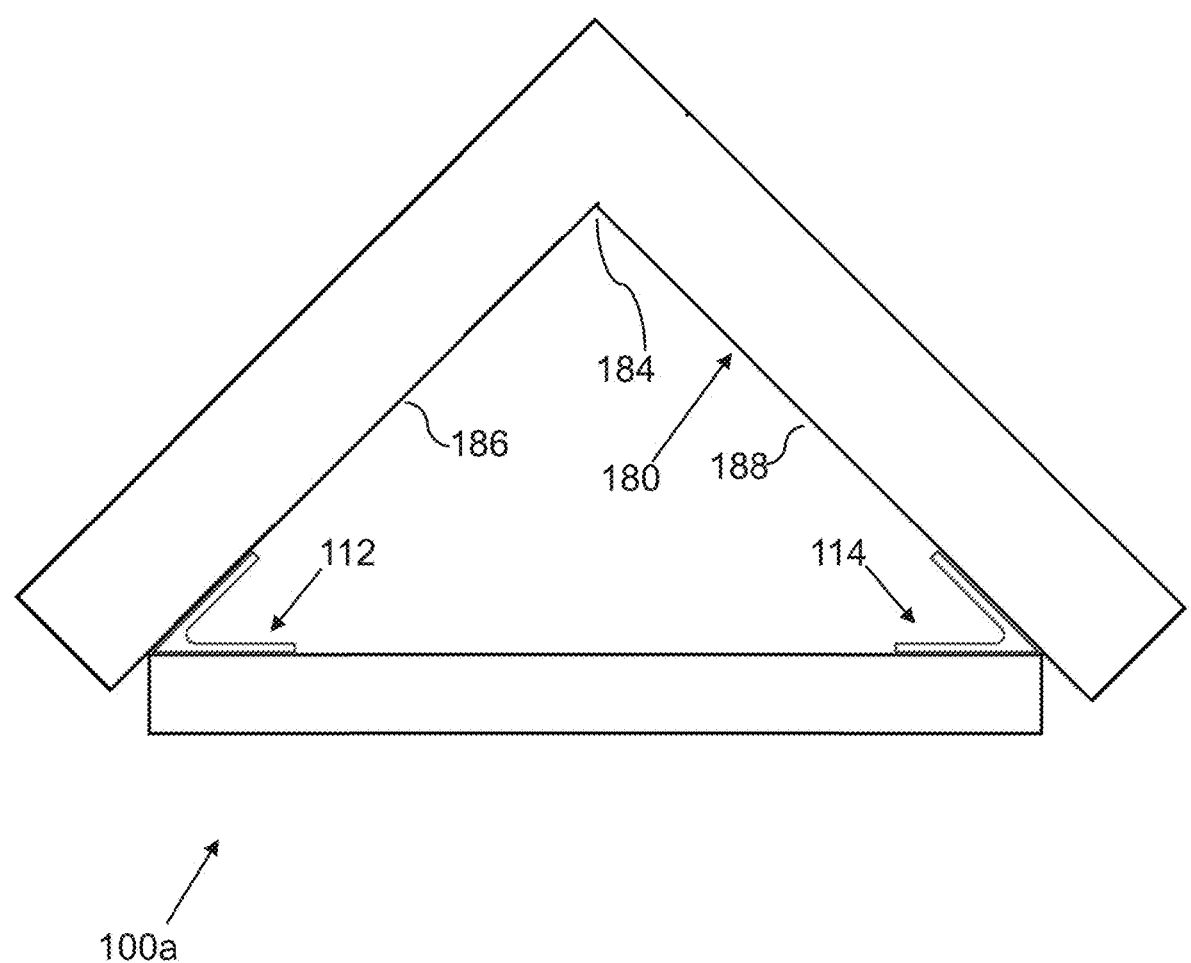
FIG. 2A is a top view of a corner mounting system configured for mounting a smaller mounting object, according to an embodiment of the invention.
Figure 2B:
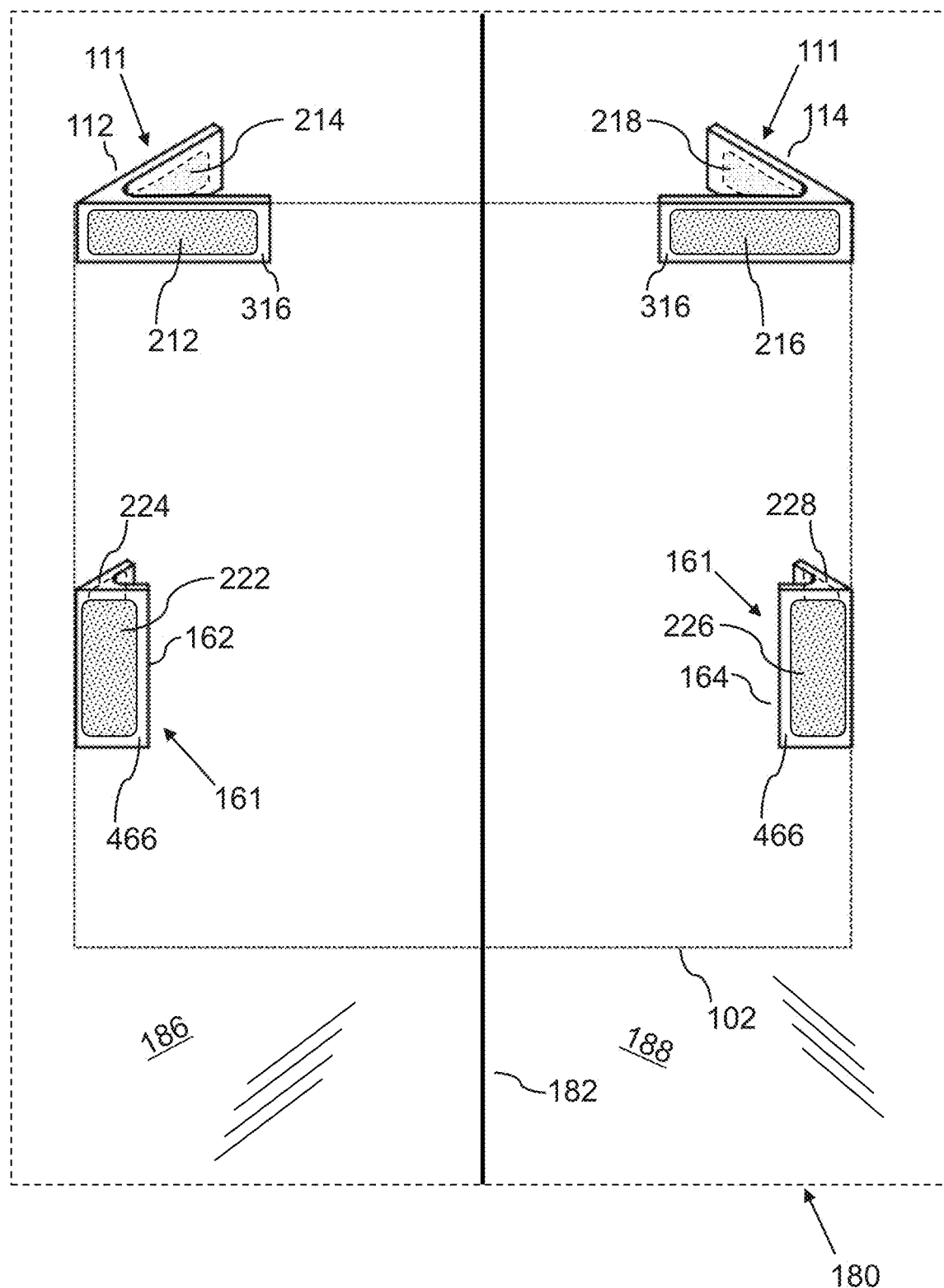
FIG. 2B is a front perspective view of a corner mounting system configured for mounting a smaller mounting object, according to an embodiment of the invention.
Figure 3A:
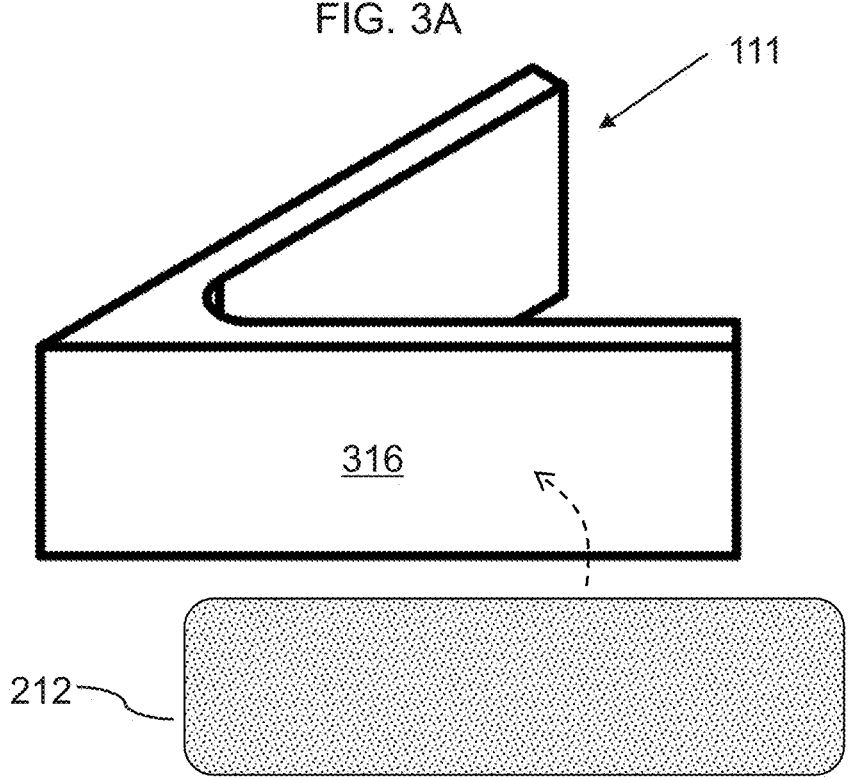
FIG. 3A is a front perspective view of a corner mounting device for mounting a smaller mounting object, according to an embodiment of the invention.
Figure 3B:
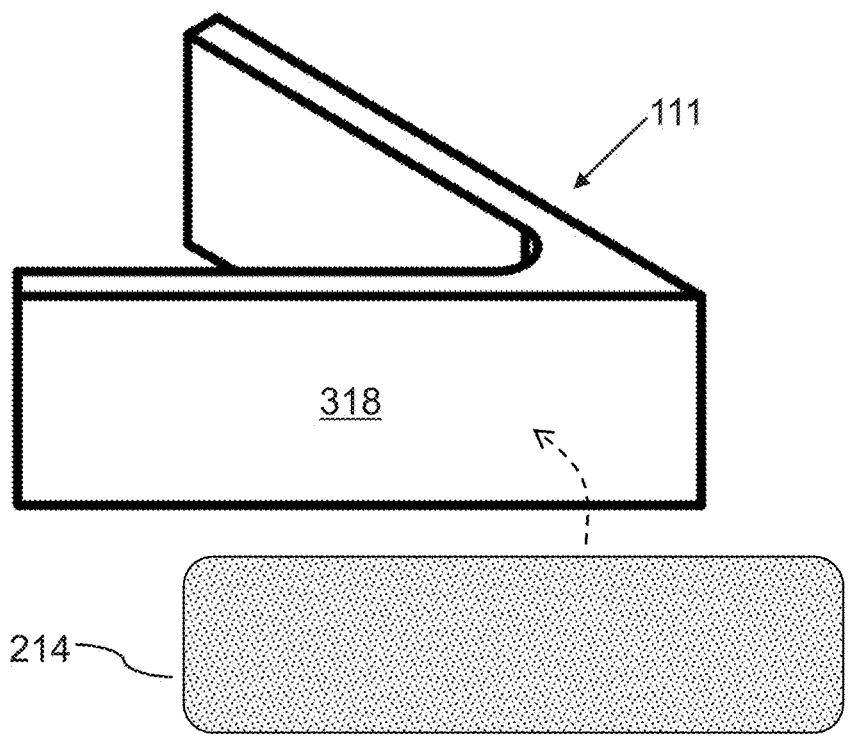
FIG. 3B is a rear perspective view of a corner mounting device for mounting a smaller mounting object, according to an embodiment of the invention.
Figure 3C:
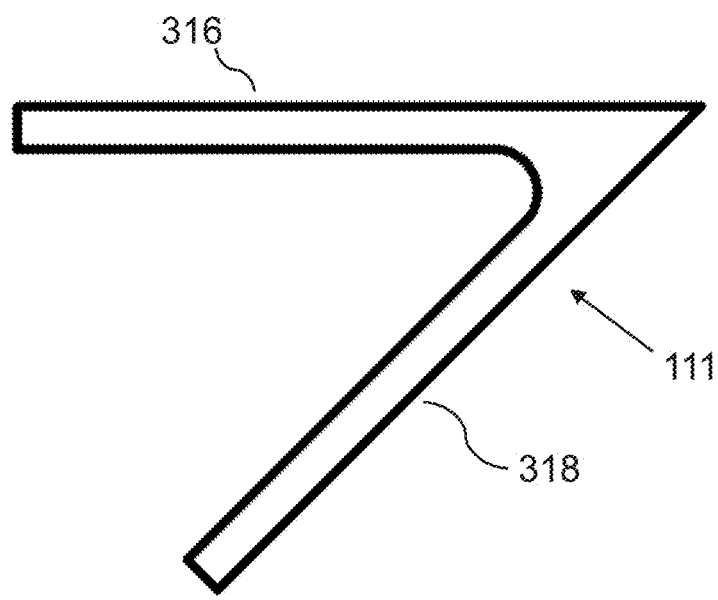
FIG. 3C is a top view of a corner mounting device for mounting a smaller mounting object, according to an embodiment of the invention.
Figure 3D:
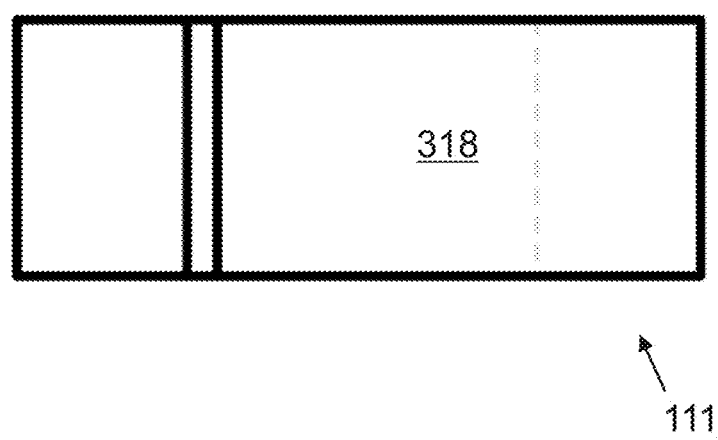
FIG. 3D is a side view of a corner mounting device for mounting a smaller mounting object, according to an embodiment of the invention.
Figure 4A:
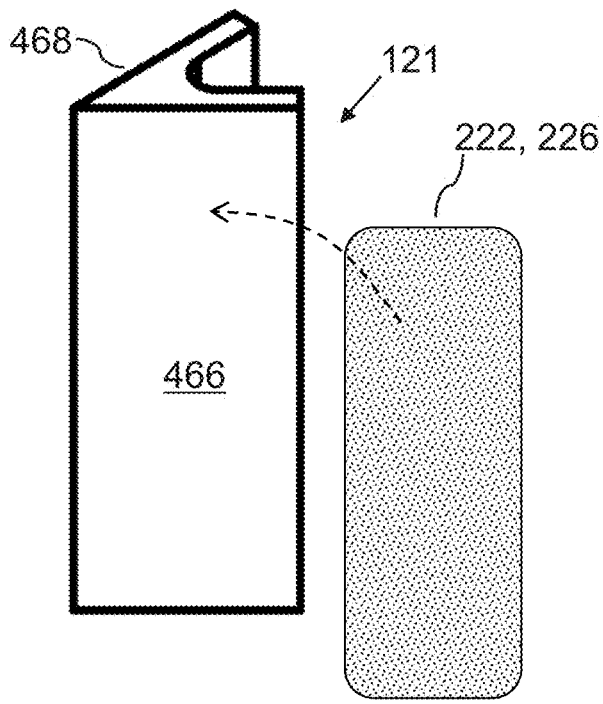
FIG. 4A is a front perspective view of a lower support member for mounting a smaller mounting object, according to an embodiment of the invention.
Figure 4C:
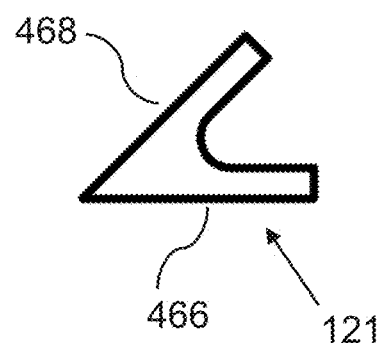
FIG. 4C is a top view of a lower support member for mounting a smaller mounting object, according to an embodiment of the invention.
Figure 4B:
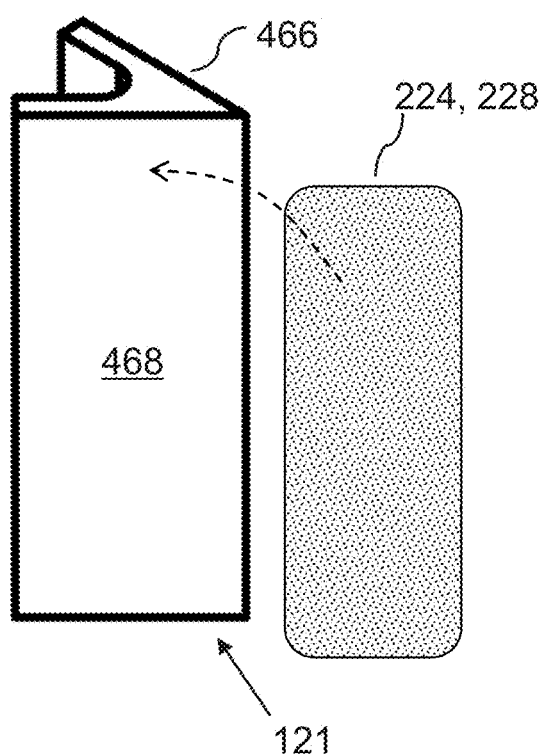
FIG. 4B is a rear perspective view of a lower support member for mounting a smaller mounting object, according to an embodiment of the invention.
Figure 4D:
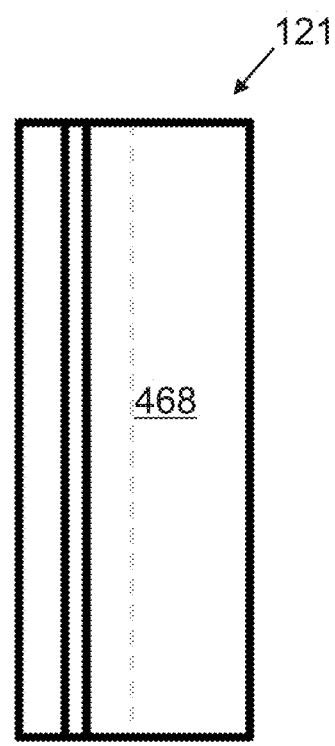
FIG. 4D is a side view of a lower support member for mounting a smaller mounting object, according to an embodiment of the invention.
Figure 5A:
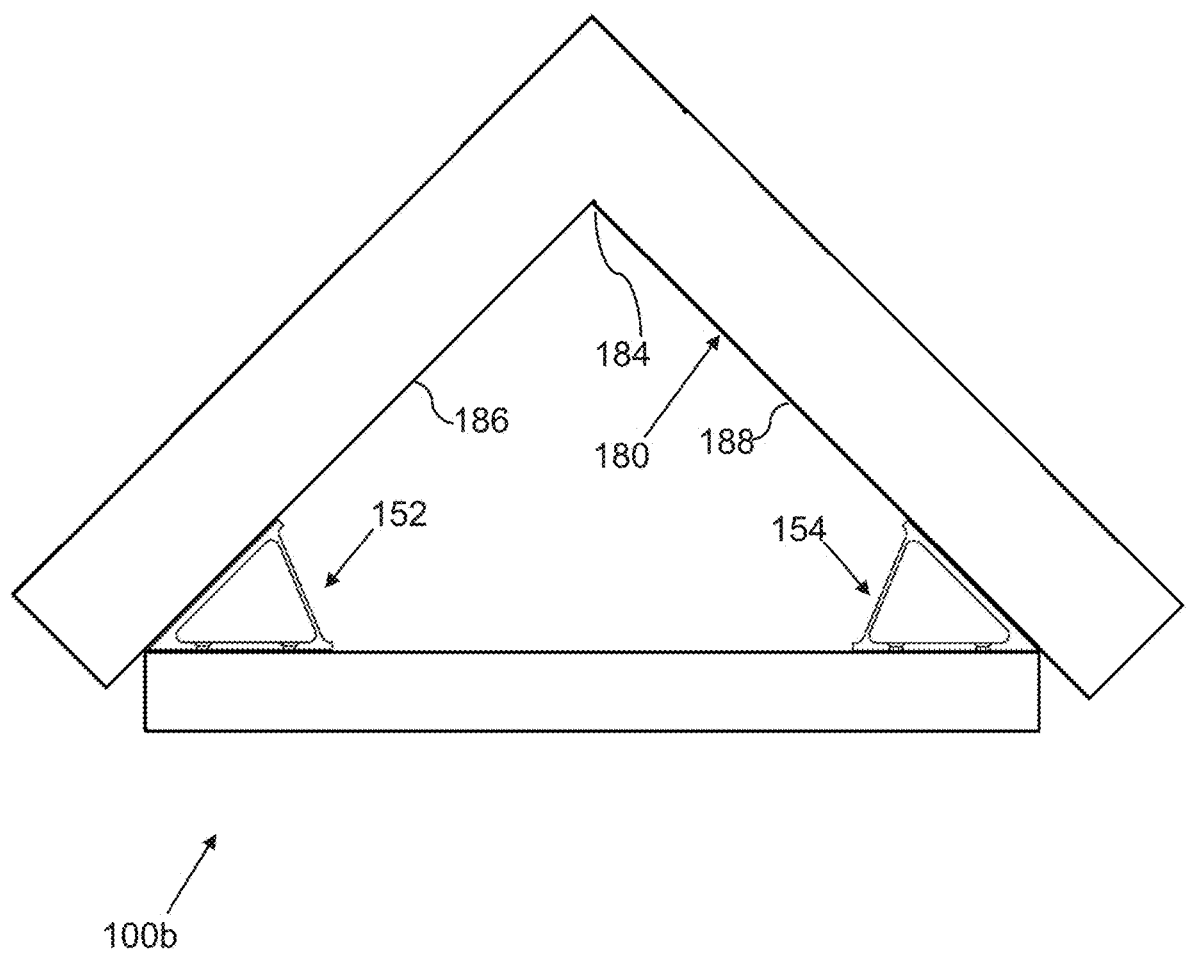
FIG. 5A is a top view of a corner mounting system configured for mounting a larger mounting object, according to an embodiment of the invention.
Figure 5B:
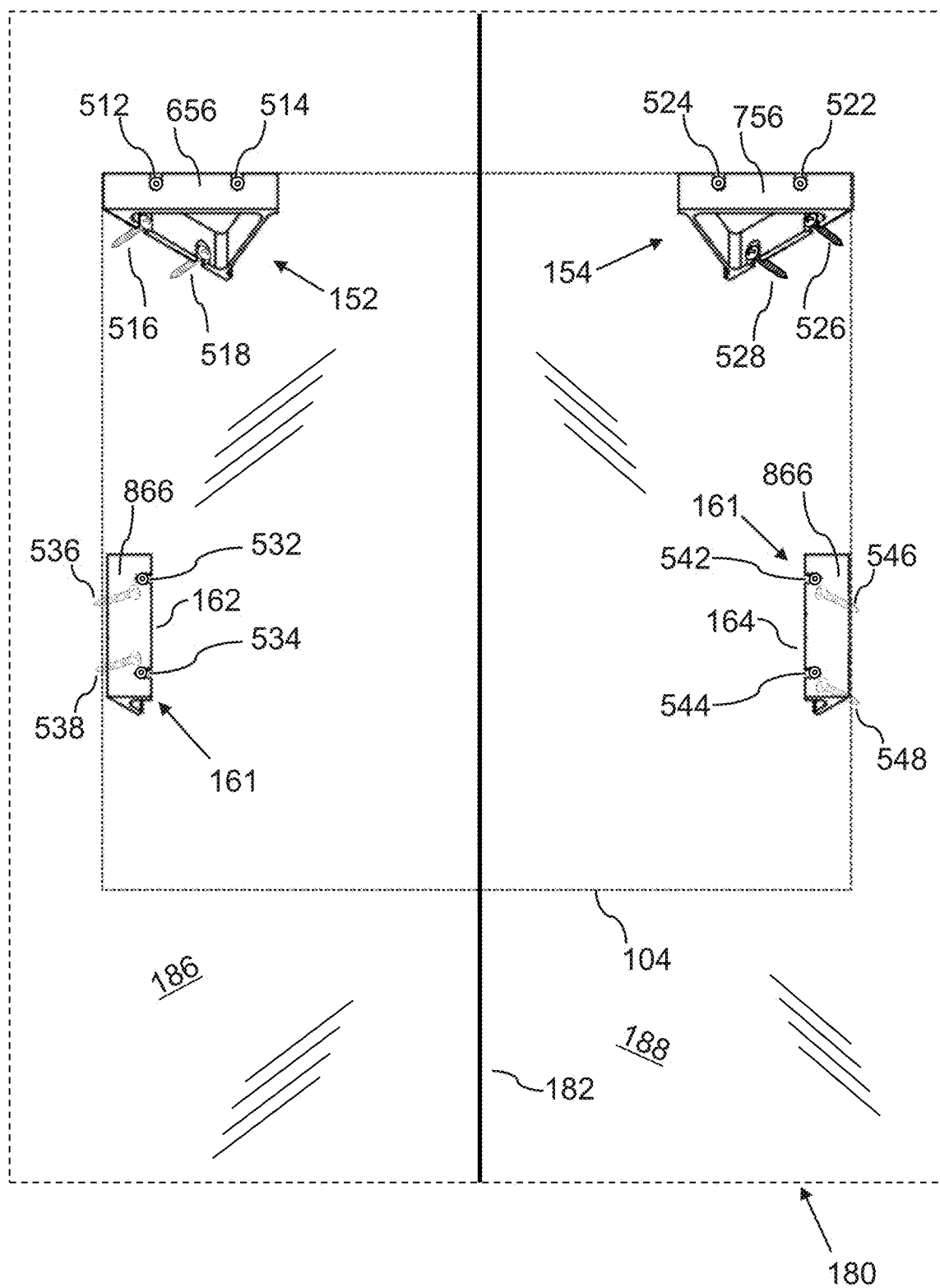
FIG. 5B is a front perspective view of a corner mounting system configured for mounting a larger mounting object, according to an embodiment of the invention.

Note that the mounting objects 102, 104, are shown in FIG. 1 as non-transparent objects with invisible parts behind a rear side of the mounting objects 102, 104 indicated in thinner dotted lines, whereas in FIGS. 2B and 5B the mounting objects 102, 104, respectively, are shown as transparent with only an outline of sides of the mounting objects 102, 104 indicated with stippled lines.

The left and right corner mounting devices 111, 112, 114 can also be referred to as left and right corner mounting brackets 111, 112, 114.

In various related embodiments, a mounting object 102, 104 can include:

a) a frame assembly 102, 104, which can include:
   i. a frame, such as a picture frame or a diploma frame;
   ii. A frame and a picture (or painting, drawing, diploma, document, etc,), wherein the picture (or painting, drawing, diploma, document, etc,) is mounted in the frame;
   iii. A picture printed on a plate;
b) a decorative and/or functional object, which includes a rear surface for mounting the right and left mounting device 111, 112, 114, decorative and/or functional object can include:

i. a plate mounted on a backing plate or frame;
ii. a decorative mounting object, such as a figure, mounted on a backing plate or frame, which includes the rear surface;
iii. a functional decorative object, such as a letter box with a lid, wherein the letter box includes the rear surface;
iv. a functional mounting object, such as a container or holder, such as an umbrella holder, which includes the rear surface.

In a related embodiment, as shown in FIG. 2B, the corner mounting system 100a, 100b can further include:
a) an upper left front double-sided tape member 212, which is configured with a pressure sensitive adhesive on rear and front sides of the upper left front double-sided tape member 212, such that the upper left front double-sided tape member 214 is configured to connect between the left front mounting surface 316, 656 of the left corner mounting device 112, 152 and the top left portion of the rear surface of the mounting object 102;
b) an upper left rear double-sided tape member 214, which is configured with a pressure sensitive adhesive on rear and front sides of the upper left rear double-sided tape member 214, such that the upper left rear double-sided tape member 214 is configured to connect between the left adjoining wall 186 and the left rear mounting surface 318, 658 of the left corner mounting device 112, 152;
c) an upper right front double-sided tape member 216, which is configured with a pressure sensitive adhesive on rear and front sides of the upper right front double-sided tape member 216, such that the upper right front double-sided tape member 216 is configured to connect between the right front mounting surface 316, 756 of the right corner mounting device 112 and the top right portion of the rear surface of the mounting object 102; and
d) an upper right rear double-sided tape member 218, which is configured with a pressure sensitive adhesive on rear and front sides of the upper right rear double-sided tape member 218, such that the upper right rear double-sided tape member 218 is configured to connect between the right adjoining wall 188 and the right rear mounting surface 318, 758 of the right corner mounting device 111, 114.

In a further related embodiment, each of the tape members 212, 214, 216, 218 can include two parts, which are connected with a hook and loop fastener.

In a related embodiment, as shown in FIGS. 1, 3A-3D, 6A-6D, and 7A-7D, the corner mounting system 100b can be configured such that:
a) the left corner mounting device 111, 112, 152 can be configured with a 45-degree angle, between the left front mounting surface 316, 656 and the left rear mounting surface 318, 658; and
b) the right corner mounting device 111, 114, 154 can be configured with a 45-degree angle, between the right front mounting surface 316, 756 and the right rear mounting surface 318, 758;
such that the mounting object 102, 104 is positioned (i.e. is positionable) in a vertical plane of a hypotenuse of a right-angled triangle, when the corner is a right-angled corner, as shown in FIGS. 2A and 5A.

In a related embodiment, as shown in FIGS. 1, 5B, 6A-6D, and 7A-7D, wherein the corner mounting system 100b can include:

a) a first left upper front screw 512, which can be screwed at least partially into the top left portion of the rear surface of the mounting object 102;
b) a second left upper front screw 514, which can be screwed at least partially into the top left portion of the rear surface of the mounting object 102;
c) a first left upper rear screw 516, which can be screwed at least partially into the left adjoining wall 186;
d) a second left upper rear screw 518, which can be screwed at least partially into the left adjoining wall 186;
e) a first right upper front screw 522, which can be screwed at least partially into the top right portion of the rear surface of the mounting object 102;
f) a second right upper front screw 524, which can be screwed at least partially into the top right portion of a rear surface of the mounting object 102;
g) a first right upper rear screw 526, which can be screwed at least partially into the right adjoining wall 188; and
h) a second right upper rear screw 528, which can be screwed at least partially into the right adjoining wall 188.

Figure 7A:
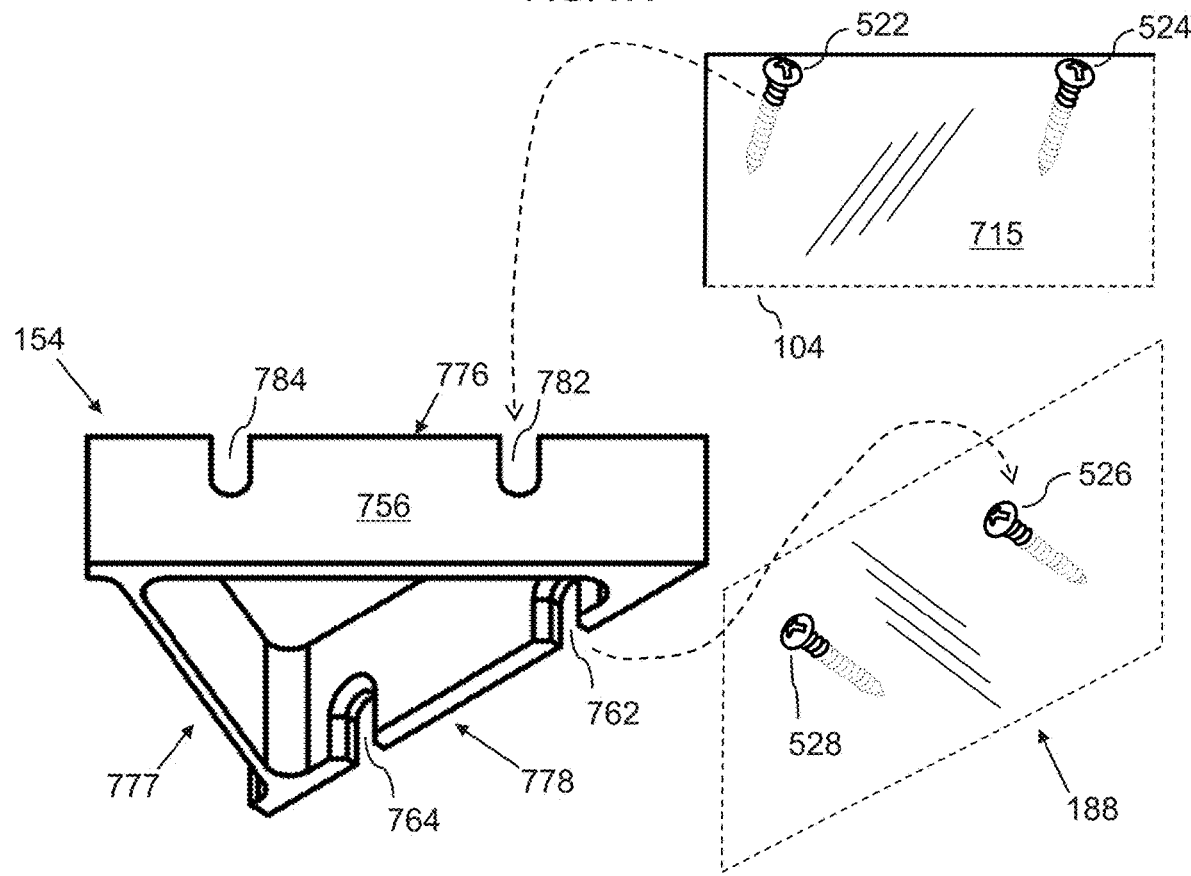
FIG. 7A is a front bottom perspective view of a right corner mounting device for mounting a larger mounting object, according to an embodiment of the invention.
Figure 7B:
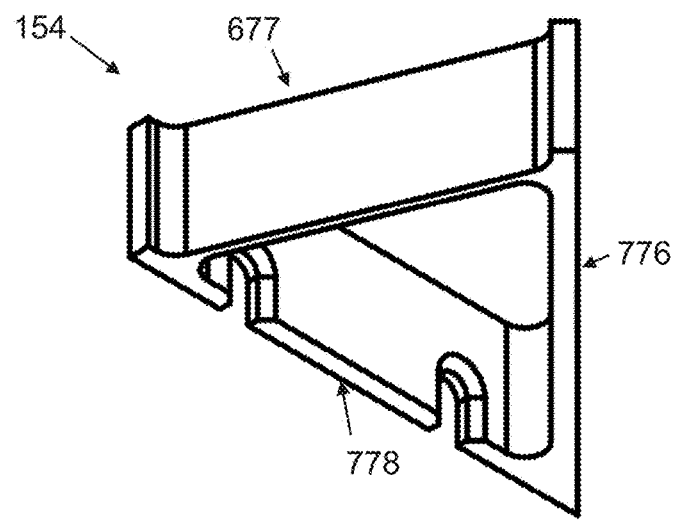
FIG. 7B is a side bottom perspective view of a right corner mounting device for mounting a larger mounting object, according to an embodiment of the invention.
Figure 7C:
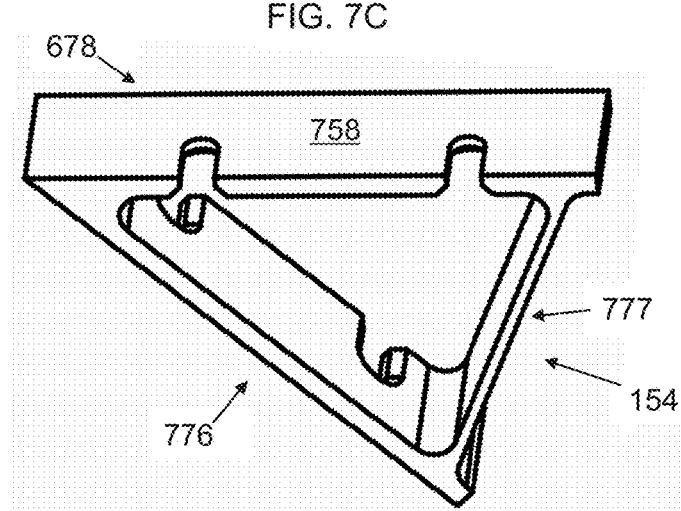
FIG. 7C is a rear bottom perspective view of a right corner mounting device for mounting a larger mounting object, according to an embodiment of the invention.
Figure 7D:
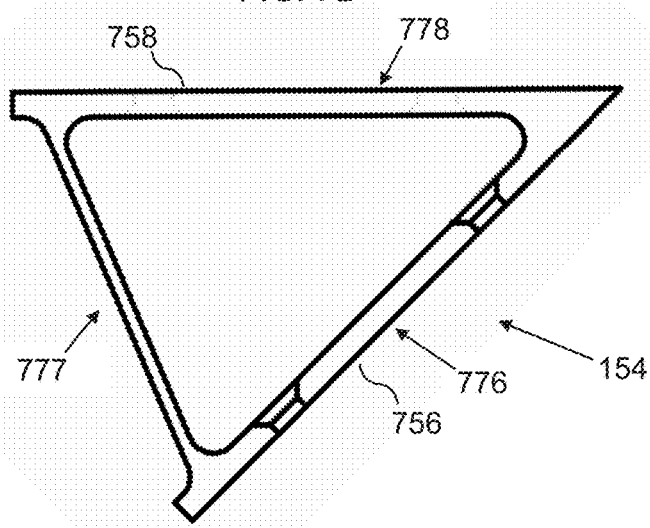
FIG. 7D is a top view of a right corner mounting device for mounting a larger mounting object, according to an embodiment of the invention.
Figure 7E:
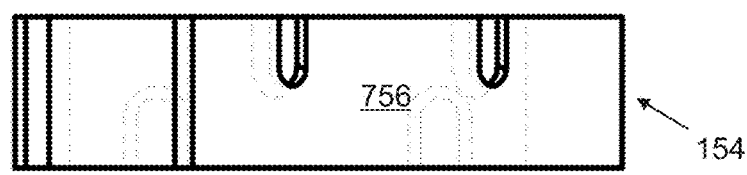
FIG. 7E is a side view of a right corner mounting device for mounting a larger mounting object, according to an embodiment of the invention.

In a related embodiment, as shown in FIGS. 1, 6A-6D, and 7A-7D, the corner mounting system 100b can be configured such that:
a) the left corner mounting device 111, 112, 152 can include:
i. a left front upper flange 676, which can include:
the left front mounting surface 316, 656; and
at least one aperture 682, 684, which can be configured as:
a first left upper notch 682 positioned in an upper side of the left front upper flange 676; and
a second left upper notch 684 positioned in the upper side of the left front upper flange 676, to a right of the first left upper notch 682,
ii. a left rear upper flange 678, which can include:
the left rear mounting surface 318, 658; and
at least one aperture 662, 664, which can be configured as:
a first left lower notch 662 positioned in a lower side of the left rear upper flange 678; and
a second left lower notch 664 positioned in a lower side of the left rear upper flange 678, to a right of the first left lower notch 662; and
iii. a left structural support flange 677;
wherein a left end of the left front upper flange 676 and a left end of the left rear upper flange 678 are connected at a 45-degree angle; and
wherein the left structural support flange is connected between a right end of the left front upper flange 676 and a right end of the left rear upper flange 678;
wherein, as shown in FIG. 6B, the first left upper notch 682 and the second left upper notch 684 are configured to slide on outer protruding portions of respectively a first left upper front screw 512 and a second left upper front screw 514, which are screwed at least partially into the top left portion of the rear surface 715 of the mounting object 104;
wherein, as shown in FIG. 6B, the first left upper notch 682 can be configured to slide on to the first left upper front screw 512 and the second left upper notch 684 can be configured to slide on to the second left upper front screw 514, such that the left corner mounting device 111, 112, 152 is connected to the top left portion of a rear surface 715 of the mounting object 104, such that the mounting object 104 is supported by (i.e. hangs from) the left corner mounting device 111, 112, 152;

wherein, as shown in FIG. 6A, the first left lower notch 662 can be configured to slide on to the first left upper rear screw 516 and the second left lower notch 664 can be configured to slide on to the second left upper rear screw 518, such that the left corner mounting device 111, 112, 152 is connected to the left adjoining wall 186, such that the left corner mounting device 111, 112, 152 is supported by (i.e. hangs from) outer protruding portions of the first left upper front screw 512 and a second left upper front screw 514 in the left adjoining wall 186; and b) the right corner mounting device 111, 114, 154 can include:
  i. a right front upper flange 776, which can include:
    the right front mounting surface 316, 656; and
    at least one aperture 782, 784, which can be configured as:
      a first right upper notch 782 positioned in an upper side of the right front upper flange 776; and
      a second right upper notch 784 positioned in the upper side of the right front upper flange 776, to a left of the first right upper notch 782;
  ii. a right rear upper flange 778, which can include:
    the right rear mounting surface 318, 658; and
    at least one aperture 762, 764, which can be configured as:
      a first right lower notch 762 positioned in a lower side of the right rear upper flange 778; and
      a second right lower notch 764 positioned in the lower side of the right rear upper flange 778, to a left of the first right lower notch 762; and
  iii. a right structural support flange 677;

wherein a right end of the right front upper flange 776 and a right end of the right rear upper flange 778 are connected at a 45-degree angle; and wherein the right structural support flange 677 is connected between a left end of the right front upper flange 776 and a left end of the right rear upper flange 778;

wherein, as shown in FIG. 7A, the first right lower notch 762 and the second right lower notch 764 can be configured to slide on to outer protruding portions of respectively a first right upper rear screw 526 and a second right upper rear screw 528, which are screwed at least partially into the right adjoining wall;

wherein, as shown in FIG. 7A, the first right upper notch 782 can be configured to slide on to the first right upper front screw 522 and the second right upper notch 784 can be configured to slide on to the second right upper front screw 524, such that the right corner mounting device 111, 114, 154 is connected to the top right portion of the rear surface 715 of the mounting object 104, such that the mounting object 104 is supported by (i.e. hangs from) the right corner mounting device 111, 114, 154;

wherein, as shown in FIG. 7A, the first right lower notch 762 can be configured to slide on to the first right upper rear screw 526 and the second right lower notch 764 can be configured to slide on to the second right upper rear screw 528, such that the right corner mounting device 111, 114, 154 is connected to the right adjoining wall 188, such that the right corner mounting device 111, 114, 154 is supported by (i.e. hangs from) outer protruding portions of the first right upper rear screw 526 and the second right upper rear screw 528 in the right adjoining wall 188.

In a further related embodiment, the notches 682, 684, 662, 664, 782, 784, 762, 764 can be substantially U-shaped (as shown in FIGS. 6A-6D and 7A-7E) and can be configured with a beveled edge or an edge configured as a ledge, in order to adapt to and secure a head of a screw 512, 514, 516, 518, 522, 524, 526, 528. The screws 512, 514, 516, 518, 522, 524, 526, 528 can be tightened after sliding onto the notches 782, 784, 762, 764, 782, 784, 762, 764 or can be directly screwed on and tightened in place.

In yet a further related embodiment, each of the left front upper flange, the left rear upper flange, the right front upper flange, and the right rear upper flange can be horizontally elongated when mounted on the mounting object 102, 104.

In various related embodiments, a corner mounting system 100a, 100b is self-leveling and self-aligning. The left and right corner mounting device 111, 112, 114 when attached correctly to the mounting object (i.e. parallel with edges of the mounting object) and the wall (i.e. flush with the wall) ensures that the mounting object is aligned correctly in a corner, plumb to the wall and horizontally level. For equidistant left and right corner mounting device 111, 112, 114 pairs, the left and right corner mounting device 111, 112, 114 can be used on either side of the mounting object.

In various related embodiments, the angles on the left and right corner mounting device 111, 112, 114 can be modified to provide a different corner aesthetic and adapt to different corner configurations. For known mounting object widths, the corner mounting device 111, 112, 114 can be manufactured as a single piece or integrated directly into a mounting object. For additional strength, multiple pairs of left and right corner mounting device 111, 112, 114 can be used along the length of the mounting object as well as increasing the width of the bracket and attachments.

In another related embodiment, as shown in FIGS. 1, 2B, and 4A-4D, the corner mounting system 100a can further include:

a) a left lower support member 121, 122, which can be an elongated V-shaped member, which can include:
  i. a left lower front support surface 466; and
  ii. a left lower rear support surface 468;
    wherein the left lower front support surface 466 is connected to a lower left portion of a rear surface of the mounting object 102;
    such that the left lower rear support surface 468 is connected to the left adjoining wall 186;
    wherein the left lower support member 161, 162 is configured with a 45-degree angle, between the left lower front support surface 466 and the left lower rear support surface 468; and b) a right lower support member 121, 124, which can be an elongated V-shaped member, which can include:
  i. a right lower front support surface 466; and
  ii. a right lower rear support surface 468;
    wherein the right lower front support surface 466 is connected to a lower right portion of a rear surface of the mounting object 102;
    wherein the right lower rear support surface 468 is connected to the right adjoining wall 188; and
    wherein the right lower support member 161, 164 is configured with a 45-degree angle, between the right lower front support surface 466 and the right lower rear support surface 468.

The left and right support members 121, 122, 124 can also be referred to as left and right support brackets 111, 112, 114.

In a related embodiment, as shown in FIG. 2B, the corner mounting system 100a, 100b can further include:
- a) a lower left front double-sided tape member 222, which is configured with a pressure sensitive adhesive on rear and front sides of lower left front double-sided tape member 222, such that the lower left front double-sided tape member 222 is configured to connect between the left adjoining wall 186 and the left lower front support surface 866 of the left lower support member 161, 162;
- b) a lower left rear double-sided tape member 224, which is configured with a pressure sensitive adhesive on rear and front sides of the lower left rear double-sided tape member 224, such that the lower left rear double-sided tape member 224 is configured to connect between the left lower rear support surface 868 of the left lower support member 161, 162 and a lower left portion of the rear surface of the mounting object 102;
- c) a lower right front double-sided tape member 226, which is configured with a pressure sensitive adhesive on rear and front sides of the lower right front double-sided tape member 226, such that the lower right front double-sided tape member 226 is configured to connect between the right adjoining wall 188 and right lower front support surface 866 of the right lower support member 161, 164; and
- d) a lower right rear double-sided tape member 228, which is configured with a pressure sensitive adhesive on rear and front sides of the lower right rear double-sided tape member 228, such that the lower right rear double-sided tape member 228 is configured to connect between the right lower rear support surface 868 of the right lower support member 161, 164 and a lower right portion of the rear surface of the mounting object 102.

In a further related embodiment, each of the tape members 222, 224, 226, 228 can include two parts, which are connected with a hook and loop fastener.

In another related embodiment, as shown in FIGS. 1 and 8A-8D, the corner mounting system 100b can further include:
- a) a left lower support member 161, 162, which can be an elongated V-shaped member, which can include:
  - i. a left lower front support surface 866; and
  - ii. a left lower rear support surface 868;
  - wherein the left lower support member 161, 162 is configured with a 45-degree angle, between the left lower front support surface 866 and the left lower rear support surface 868; and
- b) a right lower support member 161, 164, which can be an elongated V-shaped member, which can include:
  - i. a right lower front support surface 866; and
  - ii. a right lower rear support surface 868;
  - wherein the right lower support member 161, 164 is configured with a 45-degree angle, between the right lower front support surface 866 and the right lower rear support surface 868.

In a related embodiment, as shown in FIG. 5B, wherein the corner mounting system 100b can further include:
- a) a first left lower front screw 532, which can be screwed at least partially into the lower left portion of the rear surface of the mounting object 102;
- b) a second left lower front screw 534 which can be screwed at least partially into the lower left portion of the rear surface of the mounting object 102;
- c) a first left lower rear screw 536, which can be screwed at least partially into the left adjoining wall 186;
- d) a second left lower rear screw 538 which can be screwed at least partially into the left adjoining wall 186;
- e) a first right lower front screw 542, which can be screwed at least partially into the lower right portion of the rear surface of the mounting object 102;
- f) a second right lower front screw 544 which can be screwed at least partially into the lower right portion of the rear surface of the mounting object 102;
- g) a first right lower rear screw 546, which can be screwed at least partially into the right adjoining wall 188; and
- h) a second right lower rear screw 548 which can be screwed at least partially into the right adjoining wall 188.

Figure 8A:
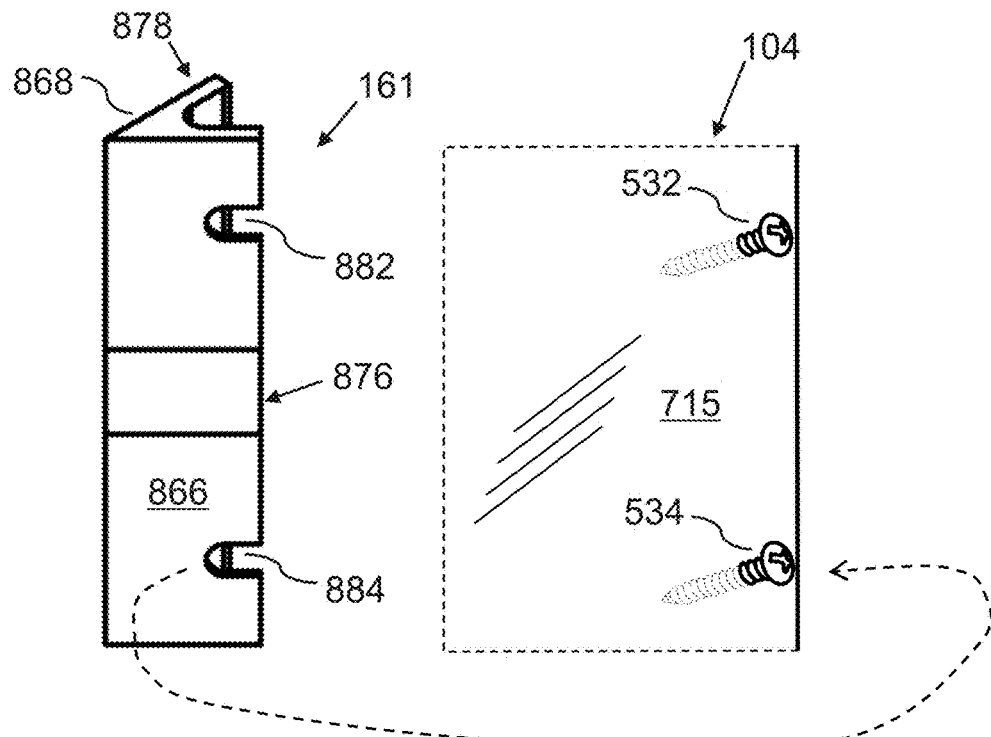
FIG. 8A is a front perspective view of a left or right lower support member for mounting a larger mounting object, according to an embodiment of the invention.
Figure 8B:
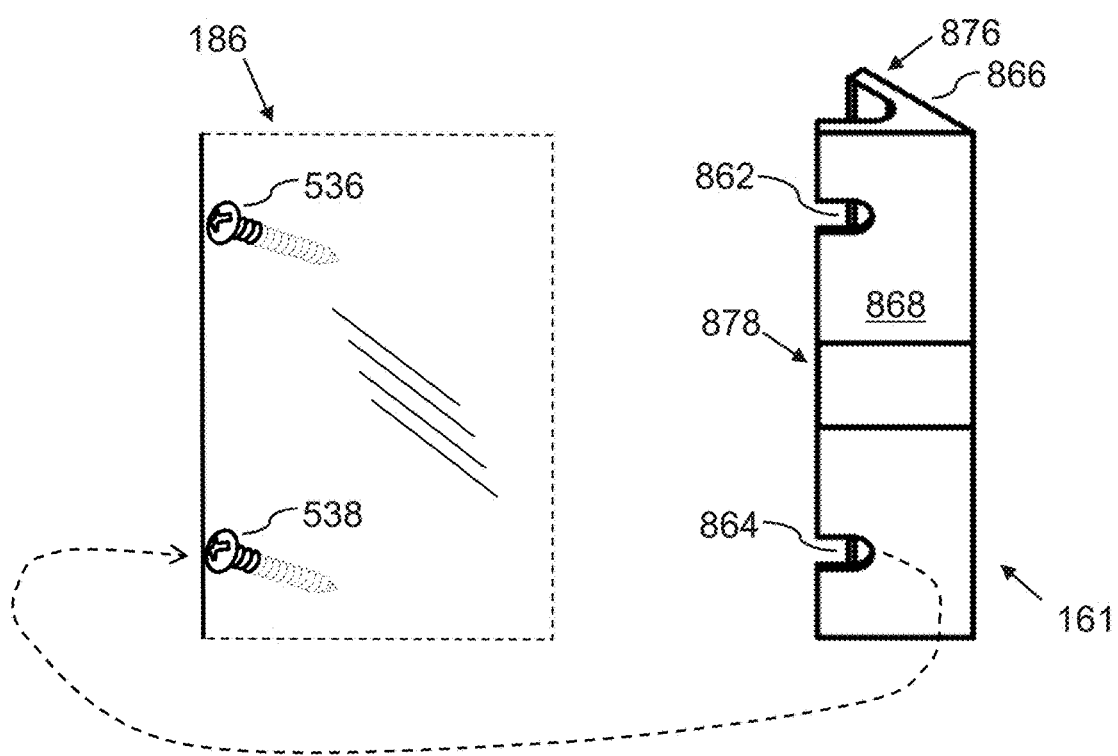
FIG. 8B is a rear perspective view of a left or right lower support member for mounting a larger mounting object, according to an embodiment of the invention.
Figure 8C:
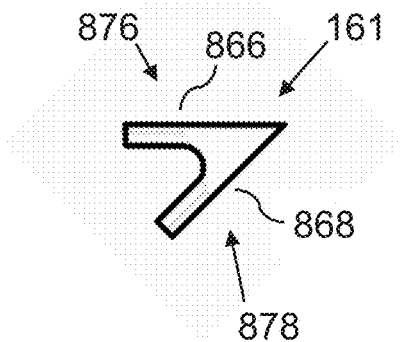
FIG. 8C is a top view of a left or right lower support member for mounting a larger mounting object, according to an embodiment of the invention.
Figure 8D:
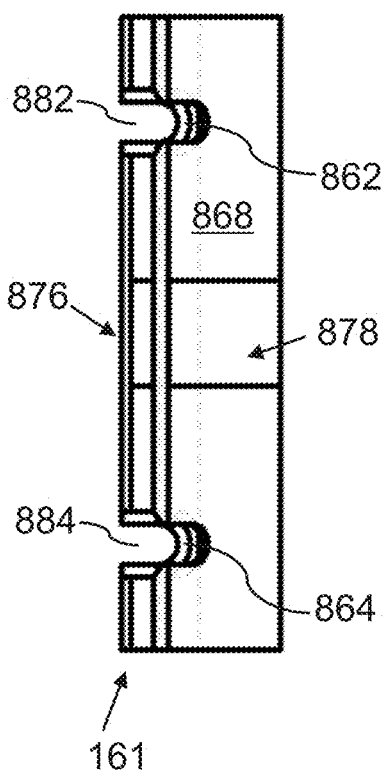
FIG. 8D is a side perspective view of a left or right lower support member for mounting a larger mounting object, according to an embodiment of the invention.
Figure 8E:
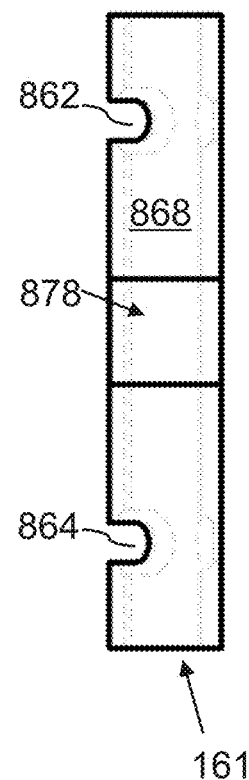
FIG. 8E is a side view of a left or right lower support member for mounting a larger mounting object, according to an embodiment of the invention.

In a related embodiment, as shown in FIGS. 1, 8A-8E, the corner mounting system 100b can be configured such that:
- a) the left lower support member 161, 162 can include:
  - i. a left front lower flange 876, which can include:
    - at least one aperture 882, 884, which can be configured as:
      - a first left front notch 882 positioned in a right side of the left front lower flange 876; and
      - a second left front notch 884 positioned in the right side of the left front lower flange 876, below the first left front notch 882; and
  - ii. a left rear lower flange 878, which can include:
    - at least one aperture 862, 864, which can be configured as:
      - a first left rear notch 862 positioned in a right side of the left rear lower flange 878; and
      - a second left rear notch 864 positioned in the right side of the left rear lower flange 878, below the first left rear notch 862; and
  wherein a left end of the left front lower flange 876 and a left end of the left rear lower flange 878 can be connected at a 45-degree angle; and
  wherein the first left front notch 882 and the second left front notch 884 are configured to slide on to outer protruding portions of respectively a first left lower front screw 532 and a second left lower front screw 534, which are screwed at least partially into a lower left portion of the rear surface 715 of the mounting object 104, as shown in FIG. 8A;
  wherein, as shown in FIG. 8A, the first left front notch 882 can be configured to slide on to the first left lower front screw 532 and the second left front notch 884 can be configured to slide on to the second left lower front screw 534,
  such that the left lower support member 161, 162 is connected to a lower left portion of a rear surface 715 of the mounting object 104, as shown in FIG. 8A;
  wherein the first left rear notch 862 and the second left rear notch 864 are configured to slide on to outer protruding portions of respectively a first left lower rear screw 536 and a second left lower rear screw 538, which are screwed at least partially into the left adjoining wall 186;
  wherein, as shown in FIG. 8B, the first left rear notch 862 can be configured to slide on to the first left lower rear screw 536 and the second left rear notch 864 can be configured to slide on to the second left lower rear screw 538,
  such that the left lower support member 161, 162 is connected to the left adjoining wall 186; and b) the right lower support member 161, 164 can include:
  i. a right front lower flange 876, which can include:
    at least one aperture 882, 884, which can be configured as:
      a first right front notch 882 positioned in a left side of the right front lower flange 876; and
      a second right front notch 884 positioned in the left side of the right front lower flange 876, below the first right front notch 882,
  ii. a right rear lower flange 878, which can include:
    at least one aperture 862, 864, which can be configured as:
      a first right rear notch 862 positioned in a left side of the right rear lower flange 878; and
      a second right rear notch 864 positioned in the left side of the right rear lower flange 878, below the first right rear notch 862; and
  wherein a right end of the right front lower flange 876 and a right end of the right rear lower flange 878 are connected at a 45-degree angle; and
  wherein the first right front notch 882 and the second right front notch 884 are configured to slide on to outer protruding portions of respectively a first right lower front screw 542 and a second right lower front screw 544, which are screwed at least partially into a lower right portion of the rear surface 715 of the mounting object 104;
  wherein the first right front notch 882 can be configured to slide on to the first right lower front screw 542 and the second right front notch 884 can be configured to slide on to the second right lower front screw 544, such that the right lower support member 161, 164 is connected to a lower right portion of a rear surface 715 of the mounting object 104;
  wherein the first right rear notch 862 and the second right rear notch 864 are configured to slide on to outer protruding portions of respectively a first right lower rear screw 546 and a second right lower rear screw 548, which are screwed at least partially into the right adjoining wall 186;
  wherein the first right rear notch 862 can be configured to slide on to the first right lower rear screw 546 and the second right rear notch 864 can be configured to slide on to the second right lower rear screw 548, such that the right lower support member 161, 164 is connected to the right adjoining wall 186.

In a further related embodiment, the notches 882, 884, 862, 864, 882, 884, 862, 864 can be substantially U-shaped (as shown in FIGS. 8A-8E) and can be configured with a beveled edge or an edge configured as a ledge, in order to adapt to and secure a head of a screw 532, 534, 536, 538, 542, 544, 546, 548. The screws 532, 534, 536, 538, 542, 544, 546, 548 can be tightened after sliding onto the notches 882, 884, 862, 864, 882, 884, 862, 864 or can be directly screwed on and tightened in place.

In yet a further related embodiment, each of the left front lower flange, the left rear lower flange, the right front lower flange, and the right rear lower flange can be vertically elongated when mounted on the mounting object 102, 104.

Here has thus been described a multitude of embodiments of the corner mounting system 100a, 100b devices, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A corner mounting system for mounting a mounting object in a corner between a left adjoining wall and a right adjoining wall, comprising:
  a) the mounting object;
  b) a left corner mounting device, comprising: a left front mounting surface; and a left rear mounting surface; a left front upper flange, which further comprises:
    the left front mounting surface; a first left upper notch positioned in an upper side of the left front upper flange; and a second left upper notch positioned in the upper side of the left front upper flange, to a right of the first left upper notch; and a left rear upper flange, which further comprises: the left rear mounting surface; a first left lower notch positioned in a lower side of the left rear upper flange; and a second left lower notch positioned in the lower side of the left rear upper flange, to a right of the first left lower notch; and
  wherein the left front mounting surface is connected to a top left portion of a rear surface of the mounting object; wherein the first left upper notch and the second left upper notch are configured to slide on to respectively a first left upper front screw and a second left upper front screw, which are screwed at least partially into the top left portion of the rear surface of the mounting object, such that the left corner mounting device is connected to the top left portion of the rear surface of the mounting object; and
  wherein the first left lower notch and the second left lower notch are configured to slide on to respectively a first left upper rear screw and a second left upper rear screw, which are screwed at least partially into the left adjoining wall, such that the left corner mounting device is connected to the left adjoining wall and
  c) a right corner mounting device, comprising: a right front mounting surface; and a right rear mounting surface; a right front upper flange, further comprising:
    the right front mounting surface; a first right upper notch positioned in an upper side of the right front upper flange; and a second right upper notch positioned in the upper side of the right front upper flange, to a left of the first right upper notch; and
  a right rear upper flange, further comprising:
    the right rear mounting surface; a first right lower notch positioned in a lower side of the right rear upper flange; and a second right lower notch positioned in the lower side of the right rear upper flange, to a left of the first right lower notch; and
  wherein the right front mounting surface is connected to a top right portion of the rear surface of the mounting object;
  wherein the first right upper notch and the second right upper notch are configured to slide on to respectively a first right upper front screw and a second right upper front screw, which are screwed at least partially into the top left right portion of the rear surface of the mounting object, such that the right corner mounting device is connected to the top right portion of the rear surface of the mounting object; and wherein the first right lower notch and the second right lower notch are configured to slide on to respectively a first right upper rear screw and a second right upper rear screw, which are screwed at least partially into the right adjoining wall, such that the right corner mounting device is connected to the right adjoining wall, such that the left rear mounting surface of the left corner mounting device is configured to connect to the left adjoining wall on a left side of the corner; and such that the right rear mounting surface of the right corner mounting device is configured to connect to the right adjoining wall on a right side of the corner.

2. The corner mounting system of claim 1, further comprising:
   a) an upper left front double-sided tape member, which is configured with pressure sensitive adhesive on rear and front sides of the upper left front double-sided tape member,
   such that the upper left front double-sided tape member is configured to connect between the left front mounting surface of the left corner mounting device and the top left portion of the rear surface of the mounting object;
   b) an upper left rear double-sided tape member, which is configured with pressure sensitive adhesive on rear and front sides of the upper left rear double-sided tape member,
   such that the upper left front double-sided tape member is configured to connect between the left adjoining wall and the left rear mounting surface of the left corner mounting device;
   c) an upper right front double-sided tape member, which is configured with pressure sensitive adhesive on rear and front sides of the upper right front double-sided tape member,
   such that the upper right front double-sided tape member is configured to connect between the right front mounting surface of the right corner mounting device and the top right portion of the rear surface of the mounting object; and
   d) an upper right rear double-sided tape member, which is configured with pressure sensitive adhesive on the rear and front sides of the upper right rear double-sided tape member,
   such that the upper right rear double-sided tape member is configured to connect between the right adjoining wall and the right rear mounting surface of the right corner mounting device.

3. The corner mounting system of claim 1,
wherein the left corner mounting device is configured with a 45-degree angle, between the left front mounting surface and the left rear mounting surface; and
the right corner mounting device is configured with a 45-degree angle, between the right front mounting surface and the right rear mounting surface;
such that the mounting object is positionable in a vertical plane of a hypotenuse of a right-angled triangle, when the corner is a right-angled corner.

4. The corner mounting system of claim 1, wherein each of the left front upper flange, the left rear upper flange, the right front upper flange, and the right rear upper flange are horizontally elongated when mounted on the mounting object.

5. The corner mounting system of claim 1,
wherein a left end of the left front upper flange and a left end of the left rear upper flange are connected at a 45-degree angle; and
wherein a right end of the right front upper flange and a right end of the right rear upper flange are connected at a 45-degree angle.

6. The corner mounting system of claim 1, further comprising:
   a) the first left upper front screw, which is screwed at least partially into the top left portion of the rear surface of the mounting object;
   b) the second left upper front screw, which is screwed at least partially into the top left portion of the rear surface of the mounting object;
   c) the first left upper rear screw, which is screwed at least partially into the left adjoining wall;
   d) the second left upper rear screw, which is screwed at least partially into the left adjoining wall;
   e) the first right upper front screw, which is screwed at least partially into the top right portion of the rear surface of the mounting object;
   f) the second right upper front screw, which is screwed at least partially into the top right portion of the rear surface of the mounting object;
   g) the first right upper rear screw, which is screwed at least partially into the right adjoining wall; and
   h) the second right upper rear screw, which is screwed at least partially into the right adjoining wall.

7. The corner mounting system of claim 1, wherein:
   a) the left corner mounting device further comprises:
      a left structural support flange;
      wherein the left structural support flange is connected between a right end of the left front upper flange and a right end of the left rear upper flange; and
   b) the right corner mounting device further comprises:
      a right structural support flange;
      wherein the right structural support flange is connected between a left end of the right front upper flange and a left end of the right rear upper flange.

8. The corner mounting system of claim 1, further comprising:
   a) a left lower support member, comprising:
      a left lower front support surface; and
      a left lower rear support surface;
      wherein the left lower front support surface is connected to a lower left portion of a rear surface of the mounting object; and
      wherein the left lower rear support surface is configured to connect to the left adjoining wall; and
   b) a right lower support member, comprising:
      a right lower front support surface; and
      a right lower rear support surface;
      wherein the right lower front support surface is connected to a lower right portion of a rear surface of the mounting object; and
      wherein the right lower rear support surface is configured to connect to the right adjoining wall.

9. The corner mounting system of claim 8,
wherein the left lower support member is configured with a 45-degree angle, between the left lower front support surface and the left lower rear support surface; and
wherein the right lower support member is configured with a 45-degree angle, between the right lower front support surface and the right lower rear support surface.

10. The corner mounting system of claim 8, further comprising:
   a) a lower left front double-sided tape member, which is configured with pressure sensitive adhesive on rear and front sides of lower left front double-sided tape member,
   such that the lower left front double-sided tape member is configured to connect between the left adjoining wall and the left lower front support surface of the left lower support member;
   b) a lower left rear double-sided tape member, which is configured with pressure sensitive adhesive on rear and front sides of the lower left rear double-sided tape member,
   such that the lower left rear double-sided tape member is configured to connect between the left lower rear support surface of the left lower support member and a lower left portion of the rear surface of the mounting object;
   c) a lower right front double-sided tape member, which is configured with pressure sensitive adhesive on rear and front sides of the lower right front double-sided tape member,
   such that the lower right front double-sided tape member is configured to connect between the right adjoining wall and right lower front support surface of the right lower support member; and
   d) a lower right rear double-sided tape member, which is configured with pressure sensitive adhesive on rear and front sides of the lower right rear double-sided tape member,
   such that the lower right rear double-sided tape member is configured to connect between the right lower rear support surface of the right lower support member and a lower right portion of the rear surface of the mounting object.

11. The corner mounting system of claim 8, wherein:
   a) the left lower support member comprises:
      a left front lower flange, which further comprises:
         a first left front notch positioned in a right side of the left front lower flange; and
         a second left front notch positioned in the right side of the left front lower flange, below the first left front notch; and
      a left rear lower flange, which further comprises:
         a first left rear notch positioned in a right side of the left rear lower flange; and
         a second left rear notch positioned in the right side of the left rear lower flange, below the first left rear notch; and
      wherein the first left front notch and the second left front notch are configured to slide on to respectively a first left lower front screw and a second left lower front screw, which are screwed at least partially into a lower left portion of the rear surface of the mounting object, such that the left lower support member is connected to the lower left portion of the rear surface of the mounting object;
      wherein the first left rear notch and the second left rear notch are configured to slide on to respectively a first left lower rear screw and a second left lower rear screw, which are screwed at least partially into the left adjoining wall, such that the left lower support member is connected to the left adjoining wall; and
   b) the right lower support member comprises:
      a right front lower flange, which further comprises:
         a first right front notch positioned in a left side of the right front lower flange; and
         a second right front notch positioned in the left side of the right front lower flange, below the first right front notch; and
      a right rear lower flange, which further comprises:
         a first right rear notch positioned in a left side of the right rear lower flange; and
         a second right rear notch positioned in the left side of the right rear lower flange, below the first left rear notch; and
      wherein the first right front notch and the second right front notch are configured to slide on to respectively a first right lower front screw and a second right lower front screw, which are screwed at least partially into a lower right portion of the rear surface of the mounting object, such that the right lower support member is connected to the lower right portion of the rear surface of the mounting object;
      wherein the first right rear notch and the second right rear notch are configured to slide on to respectively a first right lower rear screw and a second right lower rear screw, which are screwed at least partially into the right adjoining wall, such that the right lower support member is connected to the right adjoining wall.

12. The corner mounting system of claim 11, wherein a right end of the right front lower flange and a right end of the right rear lower flange are connected at a 45-degree angle; and wherein a left end of the left front lower flange and a left end of the left rear lower flange are connected at a 45-degree angle.

13. The corner mounting system of claim 11, wherein each of the left front lower flange, the left rear lower flange, the right front lower flange, and the right rear lower flange are vertically elongated when mounted on the mounting object.

14. The corner mounting system of claim 11, further comprising:
   a) the first left lower front screw, which is screwed at least partially into the lower left portion of the rear surface of the mounting object;
   b) the second left lower front screw, which is screwed at least partially into the lower left portion of the rear surface of the mounting object;
   c) the first left lower rear screw, which is configured to be screwed at least partially into the left adjoining wall;
   d) the second left lower rear screw, which is configured to be screwed at least partially into the left adjoining wall;
   e) the first right lower front screw, which is screwed at least partially into the lower right portion of the rear surface of the mounting object;
   f) the second right lower front screw which is screwed at least partially into the lower right portion of the rear surface of the mounting object;
   g) a first right lower rear screw, which is configured to be screwed at least partially into the right adjoining wall; and
   h) a second right lower rear screw, is configured to be screwed at least partially into the right adjoining wall.

15. A corner mounting system for mounting a mounting object in a corner between a left adjoining wall and a right adjoining wall, comprising:
   a) a left corner mounting device, comprising:
      a left front upper flange, which further comprises:
         a left front mounting surface;
         a first left upper notch positioned in an upper side of the left front upper flange; and a second left upper notch positioned in the upper side of the left front upper flange, to a right of the first left upper notch; and
a left rear upper flange, which further comprises:
a left rear mounting surface;
a first left lower notch positioned in a lower side of the left rear upper flange; and
a second left lower notch positioned in the lower side of the left rear upper flange, to a right of the first left lower notch; and
wherein the left front mounting surface is configured to be connected to a top left portion of a rear surface of the mounting object;
wherein the first left upper notch and the second left upper notch are configured to slide on to respectively a first left upper front screw and a second left upper front screw, which are screwed at least partially into the top left portion of the rear surface of the mounting object, such that the left corner mounting device is connected to the top left portion of the rear surface of the mounting object; and
wherein the first left lower notch and the second left lower notch are configured to slide on to respectively a first left upper rear screw and a second left upper rear screw, which are screwed at least partially into the left adjoining wall, such that the left corner mounting device is connected to the left adjoining wall; and
b) a right corner mounting device, comprising:
a right front upper flange, further comprising:
a right front mounting surface;
a first right upper notch positioned in an upper side of the right front upper flange; and
a second right upper notch positioned in the upper side of the right front upper flange, to a left of the first right upper notch;
a right rear upper flange, further comprising:
a right rear mounting surface;
a first right lower notch positioned in a lower side of the right rear upper flange; and
a second right lower notch positioned in the lower side of the right rear upper flange, to a left of the first right lower notch;
wherein the right front mounting surface is configured to be connected to a top right portion of the rear surface of the mounting object;
wherein the first right upper notch and the second right upper notch are configured to slide on to respectively a first right upper front screw and a second right upper front screw, which are screwed at least partially into the top right portion of the rear surface of the mounting object, such that the right corner mounting device is connected to the top right portion of the rear surface of the mounting object; and
wherein the first right lower notch and the second right lower notch is configured to slide on to a first right upper rear screw and a second right upper rear screw, which are screwed at least partially into the right adjoining wall,
such that the right corner mounting device is connected to the right adjoining wall;
such that the left rear mounting surface of the left corner mounting device is configured to connect to the left adjoining wall on a left side of the corner; and
such that the right rear mounting surface of the right corner mounting device is configured to connect to the right adjoining wall on a right side of the corner.

16. The corner mounting system of claim 15, further comprising:
a) an upper left front double-sided tape member, which is configured with pressure sensitive adhesive on rear and front sides of the upper left front double-sided tape member,
such that the upper left front double-sided tape member is configured to connect between the left front mounting surface of the left corner mounting device and the top left portion of the rear surface of the mounting object;
b) an upper left rear double-sided tape member, which is configured with pressure sensitive adhesive on rear and front sides of the upper left rear double-sided tape member,
such that the upper left front double-sided tape member is configured to connect between the left adjoining wall and the left rear mounting surface of the left corner mounting device;
c) an upper right front double-sided tape member, which is configured with pressure sensitive adhesive on rear and front sides of the upper right front double-sided tape member,
such that the upper right front double-sided tape member is configured to connect between the right front mounting surface of the right corner mounting device and the top right portion of the rear surface of the mounting object; and
d) an upper right rear double-sided tape member, which is configured with pressure sensitive adhesive on the rear and front sides of the upper right rear double-sided tape member,
such that the upper right rear double-sided tape member is configured to connect between the right adjoining wall and the right rear mounting surface of the right corner mounting device.

17. The corner mounting system of claim 15,
wherein the left corner mounting device is configured with a 45-degree angle, between the left front mounting surface and the left rear mounting surface; and
the right corner mounting device is configured with a 45-degree angle, between the right front mounting surface and the right rear mounting surface;
such that the mounting object is positionable in a vertical plane of a hypotenuse of a right-angled triangle, when the corner is a right-angled corner.

18. The corner mounting system of claim 15 wherein a left end of the left front upper flange and a left end of the left rear upper flange are connected at a 45-degree angle; and wherein a right end of the right front upper flange and a right end of the right rear upper flange are connected at a 45-degree angle.

19. The corner mounting system of claim 15, wherein:
a) the left corner mounting device further comprises:
a left structural support flange;
wherein the left structural support flange is connected between a right end of the left front upper flange and a right end of the left rear upper flange; and
b) the right corner mounting device further comprises:
a right structural support flange;
wherein the right structural support flange is connected between a left end of the right front upper flange and a left end of the right rear upper flange.

20. The corner mounting system of claim 15, further comprising:
a) a left lower support member, comprising:
a left lower front support surface; and
a left lower rear support surface;

wherein the left lower front support surface is connected to a lower left portion of a rear surface of the mounting object; and wherein the left lower rear support surface is configured to connect to the left adjoining wall; and b) a right lower support member, comprising:

a right lower front support surface; and a right lower rear support surface;

wherein the right lower front support surface is connected to a lower right portion of a rear surface of the mounting object; and wherein the right lower rear support surface is configured to connect to the right adjoining wall.

21. The corner mounting system of claim 20, wherein the left lower support member is configured with a 45-degree angle, between the left lower front support surface and the left lower rear support surface; and wherein the right lower support member is configured with a 45-degree angle, between the right lower front support surface and the right lower rear support surface.

22. The corner mounting system of claim 20, further comprising:

a) a lower left front double-sided tape member, which is configured with pressure sensitive adhesive on rear and front sides of lower left front double-sided tape member, such that the lower left front double-sided tape member is configured to connect between the left adjoining wall and the left lower front support surface of the left lower support member;

b) a lower left rear double-sided tape member, which is configured with pressure sensitive adhesive on rear and front sides of the lower left rear double-sided tape member, such that the lower left rear double-sided tape member is configured to connect between the left lower rear support surface of the left lower support member and a lower left portion of the rear surface of the mounting object;

c) a lower right front double-sided tape member, which is configured with pressure sensitive adhesive on rear and front sides of the lower right front double-sided tape member, such that the lower right front double-sided tape member is configured to connect between the right adjoining wall and right lower front support surface of the right lower support member; and d) a lower right rear double-sided tape member, which is configured with pressure sensitive adhesive on rear and front sides of the lower right rear double-sided tape member, such that the lower right rear double-sided tape member is configured to connect between the right lower rear support surface of the right lower support member and a lower right portion of the rear surface of the mounting object.

23. The corner mounting system of claim 20, wherein:

a) the left lower support member comprises:

a left front lower flange, which further comprises:

a first left front notch positioned in a right side of the left front lower flange; and a second left front notch positioned in the right side of the left front lower flange, below the first left front notch; and a left rear lower flange, which further comprises:

a first left rear notch positioned in a right side of the left rear lower flange; and a second left rear notch positioned in the right side of the left rear lower flange, below the first left rear notch;

wherein the first left front notch and the second left front notch are configured to slide on to respectively a first left lower front screw and a second left lower front screw, which are screwed at least partially into a lower left portion of the rear surface of the mounting object, such that the left lower support member is connected to the lower left portion of the rear surface of the mounting object; and wherein the first left rear notch and the second left rear notch are configured to slide on to respectively a first left lower rear screw and a second left lower rear screw, which are screwed at least partially into the left adjoining wall, such that the left lower support member is connected to the left adjoining wall; and b) the right lower support member comprises:

a right front lower flange, which further comprises:

a first right front notch positioned in a left side of the right front lower flange; and a second right front notch positioned in the left side of the right front lower flange, below the first right front notch; and a right rear lower flange, which further comprises:

a first right rear notch positioned in a left side of the right rear lower flange; and a second right rear notch positioned in the left side of the right rear lower flange, below the first left rear notch;

wherein the first right front notch and the second right front notch are configured to slide on to respectively a first right lower front screw and a second right lower front screw, which are screwed at least partially into a lower right portion of the rear surface of the mounting object, such that the right lower support member is connected to the lower right portion of the rear surface of the mounting object; and wherein the first right rear notch and the second right rear notch are configured to slide on to respectively a first right lower rear screw and a second right lower rear screw, which are screwed at least partially into the right adjoining wall, such that the right lower support member is connected to the right adjoining wall.

24. The corner mounting system of claim 23, wherein a right end of the right front lower flange and a right end of the right rear lower flange are connected at a 45-degree angle; and wherein a left end of the left front lower flange and a left end of the left rear lower flange are connected at a 45-degree angle.

\* \* \* \* \*